(12) United States Patent
Clark, Jr. et al.

(10) Patent No.: US 7,980,916 B2
(45) Date of Patent: *Jul. 19, 2011

(54) WALL RACER TOY VEHICLES

(76) Inventors: Leonard R. Clark, Jr., Oreland, PA (US); H. Peter Greene, Jr., Boyertown, PA (US)

(*) Notice: Subject to any disclaimer, the term of this patent is extended or adjusted under 35 U.S.C. 154(b) by 180 days.

This patent is subject to a terminal disclaimer.

(21) Appl. No.: 12/379,461

(22) Filed: Feb. 23, 2009

(65) Prior Publication Data

US 2009/0203292 A1    Aug. 13, 2009

Related U.S. Application Data

(63) Continuation-in-part of application No. 11/177,428, filed on Jul. 11, 2005, now Pat. No. 7,753,755.

(60) Provisional application No. 60/640,041, filed on Dec. 30, 2004.

(51) Int. Cl.
*A63H 30/00* (2006.01)

(52) U.S. Cl. ..................... 446/454; 446/177; 446/178

(58) Field of Classification Search .................. 446/454
See application file for complete search history.

(56) References Cited

U.S. PATENT DOCUMENTS

| | | | |
|---|---|---|---|
| 3,246,711 A | * | 4/1966 | Snoeyenbos |
| 3,810,515 A | * | 5/1974 | Ingro |
| 3,926,277 A | * | 12/1975 | Shino |
| D238,798 S | | 2/1976 | Goldfarb |
| 4,386,801 A | * | 6/1983 | Chapman |
| D274,344 S | | 6/1984 | Boudreaux |
| 4,459,776 A | | 7/1984 | Jaworski |
| 4,470,219 A | | 9/1984 | Sugimoto |
| 4,813,906 A | | 3/1989 | Matsuyama et al. |
| 4,971,591 A | | 11/1990 | Raviv et al. |
| D332,978 S | | 2/1993 | Tsuchiya |
| D332,979 S | | 2/1993 | Tsuchiya |
| 5,194,032 A | * | 3/1993 | Garfinkel |
| D369,839 S | | 5/1996 | Tilbor et al. |
| 5,536,199 A | | 7/1996 | Urakami |
| D403,023 S | | 12/1998 | Araki |

(Continued)

FOREIGN PATENT DOCUMENTS

CN      200970474 Y      11/2007

(Continued)

OTHER PUBLICATIONS

Lauda, "The New Formula One: A Turbo Age" pp. 39, 42 (1984).*

*Primary Examiner* — Melba Bumgarner
*Assistant Examiner* — Tramar Harper
(74) *Attorney, Agent, or Firm* — Michael de Angeli (57) ABSTRACT

A motorized toy vehicle or Wall Racer that is capable of operating on vertical and inverted horizontal surfaces such as walls and ceilings, while being manufacturable at reasonable cost and operable on batteries having sufficient lifetime as to be enjoyable. One or more battery-powered fans draw air from around all or defined portions of the periphery of the chassis of the Wall Racer through a carefully-shaped duct, so that the air in the portion of the duct immediately adjacent the surface flows at high velocity and low pressure; the relatively greater pressure of the surrounding air urges the vehicle against the surface, allowing it to operate on vertical surfaces, such as walls, or inverted on horizontal surfaces, such as ceilings.

37 Claims, 9 Drawing Sheets

U.S. PATENT DOCUMENTS

| | | |
|---|---|---|
| 6,554,241 B1 | 4/2003 | Leshem |
| 6,582,275 B1 | 6/2003 | Lai |
| 6,641,457 B1 | 11/2003 | Lai |
| 6,840,839 B2 | 1/2005 | Rehkemper et al. |
| D524,880 S | 7/2006 | Yuen |
| D532,835 S | 11/2006 | Suimon |
| D534,967 S | 1/2007 | Clark et al. |
| D572,773 S | 7/2008 | Horikoshi |
| D572,774 S | 7/2008 | Horikoshi |
| D577,083 S | 9/2008 | Nakayama |
| 2002/0160688 A1 | 10/2002 | Rehkemper et al. |

FOREIGN PATENT DOCUMENTS

GB     2269142    *   7/1993

* cited by examiner

WALL RACER TOY VEHICLES

CROSS-REFERENCE TO RELATED APPLICATION

This application is a continuation-in-part of Ser. No. 11/177,428, filed Jul. 11, 2005 now U.S. Pat. No. 7,753,755, which claimed priority from U.S. provisional application 60/640,041, filed Dec. 30, 2004. This application also claims priority from U.S. design patent application Ser. No. 29/312,447, filed Oct. 21, 2008.

FIELD OF THE INVENTION

This invention relates to radio-controlled motorized toy vehicles capable of operation on surfaces of all orientations, e.g., walls and ceilings as well as floors.

BACKGROUND OF THE INVENTION

Radio-controlled motorized toy vehicles, that is, vehicles driven by motors and steered responsive to commands transmitted remotely, are of course well-known. Toy vehicles that are very sophisticated in terms of their suspension and steering systems are available and are very popular. A toy vehicle that operated other than on essentially horizontal surfaces, e.g., which could operate on a vertical wall, or inverted on a ceiling, and which could be made and sold at a competitive price, would be very desirable.

U.S. Pat. No. 5,014,803 to Urakami shows a device for "suction-adhering" to a wall and moving along the wall, e.g. for cleaning the interiors of tanks and the like. The Urakami device relies on a relative vacuum; that is, air is drawn by a vacuum pump out from a sealed volume formed between the interior of the device and the wall, so that air pressure on the outer surface of the device forces it against the wall. This necessitates that an essentially air-tight seal be formed around the periphery of the device. Forming an air-tight seal between a moving device and a fixed surface is not a simple problem, and the Urakami patent is directed primarily to such seals. The obvious problems to be overcome are friction between the sealing member and the wall, which impedes motion of the device and causes wear of the sealing members, loss of vacuum at irregularities in the surface, and the large amount of power required to form an effective vacuum. This approach is not satisfactory for a toy vehicle that must be durable when operated by children and be able to be operated for a sufficiently long time with a limited amount of battery capacity to not frustrate the user.

SUMMARY OF THE INVENTION

The present invention provides a motorized toy vehicle that is capable of operating on vertical and inverted horizontal surfaces such as walls and ceilings, while being manufacturable at reasonable cost and operable on batteries having sufficient lifetime as to be enjoyable. The vehicle of the invention, referred to hereinafter as the Wall Racer, employs a freely-flowing stream of air between the surface-abutting periphery of the interior volume of the vehicle to create a pressure differential with respect to the surrounding air, so that the pressure of the surrounding air urges the Wall Racer against the surface.

More specifically, one or more battery-powered fans draw air from around all or defined portions of the periphery of the chassis of the Wall Racer through a carefully-shaped duct formed between the undersurface of the chassis and a juxtaposed surface, so that the air in the portion of the duct immediately adjacent the surface flows at high velocity. According to Bernoulli's Principle, this high-velocity air stream is of low pressure; the differential between this low-pressure air stream and the relatively greater pressure of the surrounding air urges the vehicle against the surface, allowing it to adhere to vertical surfaces, such as walls, or be operated inverted on horizontal surfaces, such as ceilings. The differential pressure thus urging the vehicle against the surface is referred to hereinafter, as in the automotive industry, as "downforce". Because the air stream must be freely flowing to attain high velocity, seals such as required for wall-climbing vehicles employing a vacuum (and which make it very difficult to provide workable vehicles, as above) are unnecessary. Indeed, entry of the air into the duct formed between the undersurface of the chassis and the juxtaposed surface is essential, and is controlled carefully to ensure stable, and insofar as possible non-turbulent flow.

It would be of self-evident amusement interest, or "toy value", to provide a radio-controlled vehicle capable of making the transition between operation on a floor to climbing a wall, and the Wall Racer in certain embodiments can do so. In order that the vehicle can make the transition, the fan(s) driving the air stream are actuated only when the vehicle begins to climb the wall.

Other inventive aspects of the Wall Racer will appear as the discussion below proceeds.

BRIEF DESCRIPTION OF THE DRAWINGS

The invention will be better understood if reference is made to the accompanying drawings, in which:

FIG. 13 shows a cross-sectional view of a switch employed to actuate the fans when the Wall Racer transitions from floor to wall operation, and which prevents its operation inverted on a ceiling, for safety reasons, while

FIGS. 14, 15, and 16 show respectively a perspective view, an elevation in partial cross-section, and an enlarged cross-section of a caster used in several of the embodiments of the Wall Racer, while FIGS. 17, 18, and 19 show a further embodiment of the invention, wherein FIG. 17 is a schematic plan view, FIG. 18 a partial cross-section taken along the line 18-18 in FIG. 17, with certain components shown in dotted lines.

DESCRIPTION OF THE PREFERRED EMBODIMENTS

It will be apparent that one type of Wall Racer toy vehicle that would be desirably offered is one resembling an automobile, for example a race car, while other sorts of vehicles, such as trucks or military vehicles, e.g., armored tanks, might also be of interest. The first, second, fourth and fifth embodiments of the Wall Racer discussed herein are of generally elongated shape, so as to be fitted with model automobile bodies not otherwise contributing to the operation of the Wall Racer, while the third embodiment is circular and might be made to resemble a "flying saucer" type of space vehicle. All of these embodiments operate similarly, with differences as occasioned by the differing body shapes.

Figure 1:
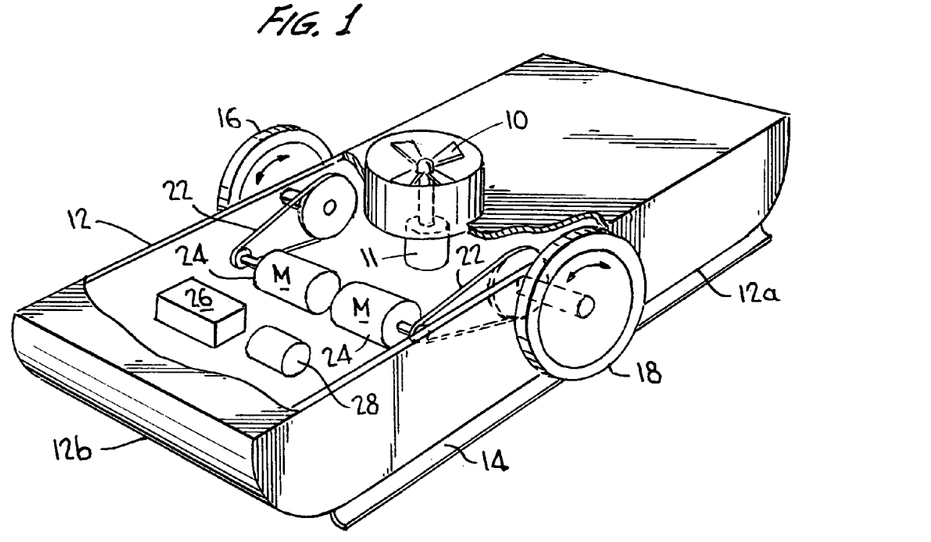
FIG. 1 and FIG. 2 show respectively a perspective view and an elevation in partial cross-section of a first embodiment of the Wall Racer.
Figure 2:
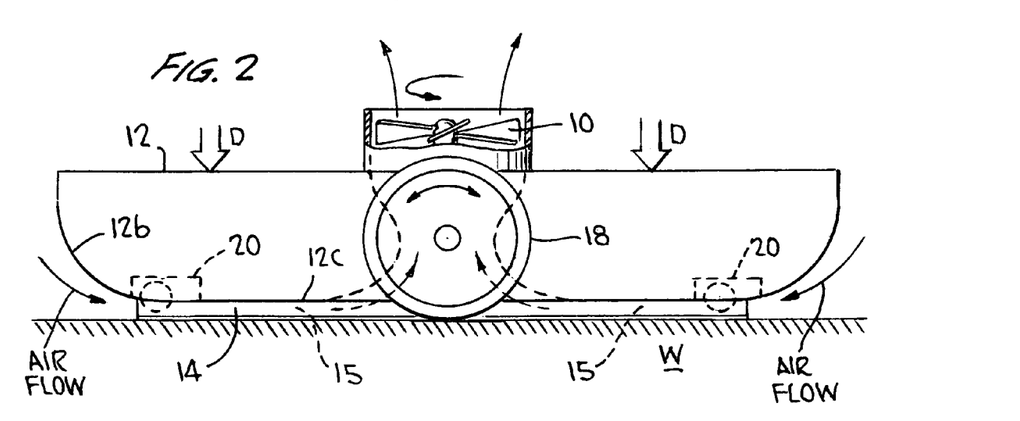

For example, FIGS. 1 and 2 show respectively a perspective and an elevation in partial cross-section of a first embodiment of the Wall Racer, which as noted is generally elongated and could readily be fitted with a model race car or other vehicle body (not shown). As mentioned above, in order that downforce urging the Wall Racer against an abutting surface W (hereinafter simply "the wall") can be developed, a high velocity stream of air is induced to flow in an underbody venturi duct formed between the undersurface of the chassis of the Wall Racer and the wall W. According to Bernoulli's Principle, as above, such a high velocity stream of air will be of reduced pressure with respect to the ambient air. The differential between this reduced pressure and the surrounding atmospheric pressure generates a resultant force D, termed "downforce" where, as here, its direction is such as to urge the vehicle "downwardly" toward the wall W. The amount of downforce D developed is proportional to the area over which the low pressure is created, and to the differential in pressure per unit area, so this area and the differential pressure must be adequate for the purpose.

Thus, as illustrated in FIGS. 1 and 2, a fan 10 is mounted in a fan duct extending through the chassis 12, and is driven by a battery-powered motor 11 so as to draw a high-velocity stream of air in from around at least a portion of the periphery of chassis 12. The stream of air flows through an underbody venturi duct 15 formed between the underside of chassis 12 and the juxtaposed surface of wall W, and is exhausted on the "upper" side of chassis 12, that is, on the side away from the abutting wall W. Downforce D is created as noted due to the differential in pressure between the low pressure of the high-velocity air stream in the underbody venturi duct and the ambient air; as noted, the total amount of downforce is proportional to the area over which the low pressure is developed, and to the differential in pressure at each point.

To maximize the area of low pressure by avoiding air being drawn in along the edges 12a of the chassis 12, that is, to ensure that the air stream is principally drawn in at the ends 12b of the chassis 12, flexible "skirts" 14 extend from the chassis 12 toward wall W and form a partial seal therebetween, limiting "short-cutting" of air from the sides of the chassis juxtaposed to the fan duct. The skirts thus define one or more, in this case two, sections of the periphery of the underbody of the chassis at which air is drawn into an entry portion of the underbody venturi duct, which directs airflow into the fan duct. Accordingly, air is drawn in primarily at the ends 12b, which are provided with a broad radius to ensure smooth and insofar as possible non-turbulent airflow; for similar reasons, the undersurface 12c of the chassis 12 is smooth. Thus the high-velocity air stream extends for a substantial portion of the overall length of the chassis, ensuring that adequate downforce is developed. In the absence of the skirts 14, air would tend to be drawn in along the sides of the chassis, limiting the area over which the reduced pressure is developed, and thus limiting downforce; there would likely also be considerable turbulence, further interfering airflow and reducing downforce.

In some circumstances, a further increase in downforce can be realized by limiting the clearance between the ends of the undersurface of the chassis and the wall surface, e.g., by providing downwardly extending baffles, akin to the side skirts 14 but extending only to the wall surface, that is, not intended to be drawn against the wall surface as are the side skirts 14. The reduction in intake area causes a further acceleration of the air flowing under these baffles, further reducing the pressure and increasing the downforce.

By comparison, in the generally circular third embodiment of the Wall Racer shown in FIGS. 8 and 9 (discussed further below) a substantial distance exists between all points on the outer periphery of the undersurface of its chassis and the centrally-located exhaust duct, so that the airflow in this embodiment is radially inwardly from all directions, the downforce is developed uniformly around the chassis, and no skirts need to be fitted.

As noted, the differential in pressure and thus the downforce developed is a function of the air velocity, which up to a point can be increased by reducing the cross-sectional area of the duct formed between the underside of the chassis and the wall W, that is, by reducing the ground clearance of the Wall Racer. However, if the cross-sectional area is reduced too much, turbulence will impede flow and reduce the desired effect; reducing the ground clearance would also increase the Wall Racer's sensitivity to surface irregularities and the like. No detailed theoretical calculations have as yet been carried out which would allow optimization of the effect sought. For example, by optimizing the duct design the current draw of the motor powering the fan inducing the flow could perhaps be reduced, increasing operating time per battery charge. Detailed specifications of the duct and other components employed in a successfully-tested embodiment of the Wall Racer are provided below.

Returning to discussion of the first embodiment of FIGS. 1 and 2, as illustrated the chassis 12 is supported by two opposed drive wheels 16 and 18, spaced transversely from one another on either side of the chassis near the midpoint thereof, and by opposed casters 20 (that is, devices comprising freely-rotating wheels mounted for pivoting about an axis perpendicular to their axis of rotation) at either end of the chassis 12. As indicated schematically by belt drives 22, the opposed drive wheels 16 and 18 are separately powered by motors 24 that are supplied with current by a battery pack 28 in response to control signals provided by radio-controlled receiver 26. The overall construction and operation of these components is conventional except as noted and will not be discussed in detail herein. Thus, if both motors are controlled to drive wheels 16 and 18 in the same direction, the Wall Racer moves in that direction, while turning is accomplished by driving the wheels 16 and 18 in differing directions or at differing rates. Casters 20 are unpowered, mounted on the longitudinal centerline of chassis 12, and simply serve to maintain the correct spacing between undersurface 12c of chassis 12 and wall W; preferred locations and design of casters 20 are discussed below.

The "differential" drive scheme shown is preferred over, for example, a conventional four-wheel chassis, with one pair of wheels powered and one pair steering, for the following reasons. In order that a vehicle can climb a vertical wall, sufficient downforce must be exerted, urging the vehicle toward the wall, not only to support the vehicle against the force of gravity but also to provide sufficient traction to propel the vehicle vertically against gravity. (By comparison, providing a vehicle that operates inverted on a ceiling is simplified, since it need only support itself and need not also climb vertically.) Ensuring good traction thus becomes paramount.

So as to maximize the traction provided by the downforce available, the drive wheels are located centrally, at the center of the pressure exerted by the downforce, so that essentially all of the downforce is transmitted directly to the drive wheels, maximizing traction.

The casters 20 are preferably mounted so that both do not simultaneously touch a flat surface, so that a three-point support is always available, with the drive wheels 16 and 18 forming two of the three contact points. The motion thus provided, whereby the vehicle can rock slightly back and forth about the axis of the drive wheels 16 and 18, as one or the other of casters 20 touches the wall W, is referred to as "teeter" herein. Thus the downforce is balanced over the central drive axle, which maximizes traction, while allowing the vehicle to be steered by differential driving of the opposed drive wheels 16 and 18.

Figure 3:
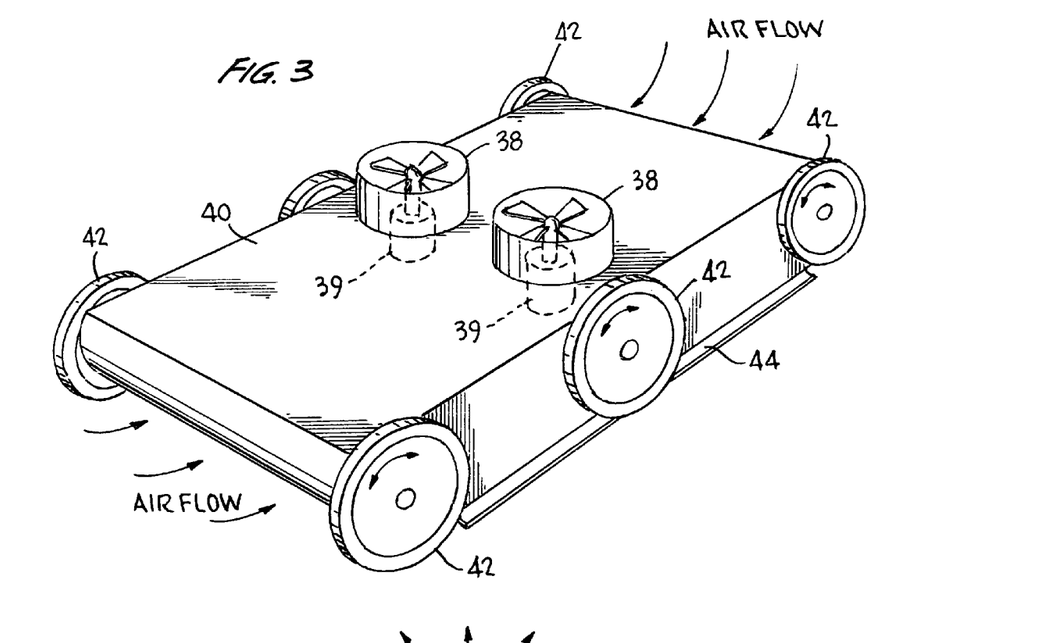
FIG. 3 and FIG. 4 show respectively a perspective view and an elevation in partial cross-section of a second embodiment of the Wall Racer.
Figure 4:
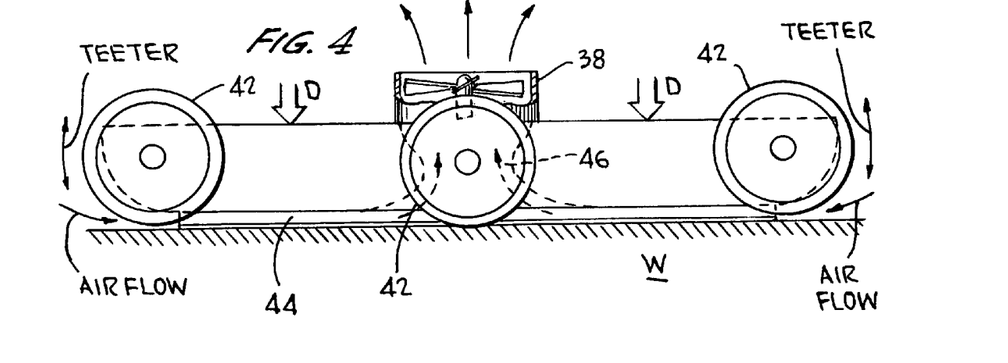
Figure 12:
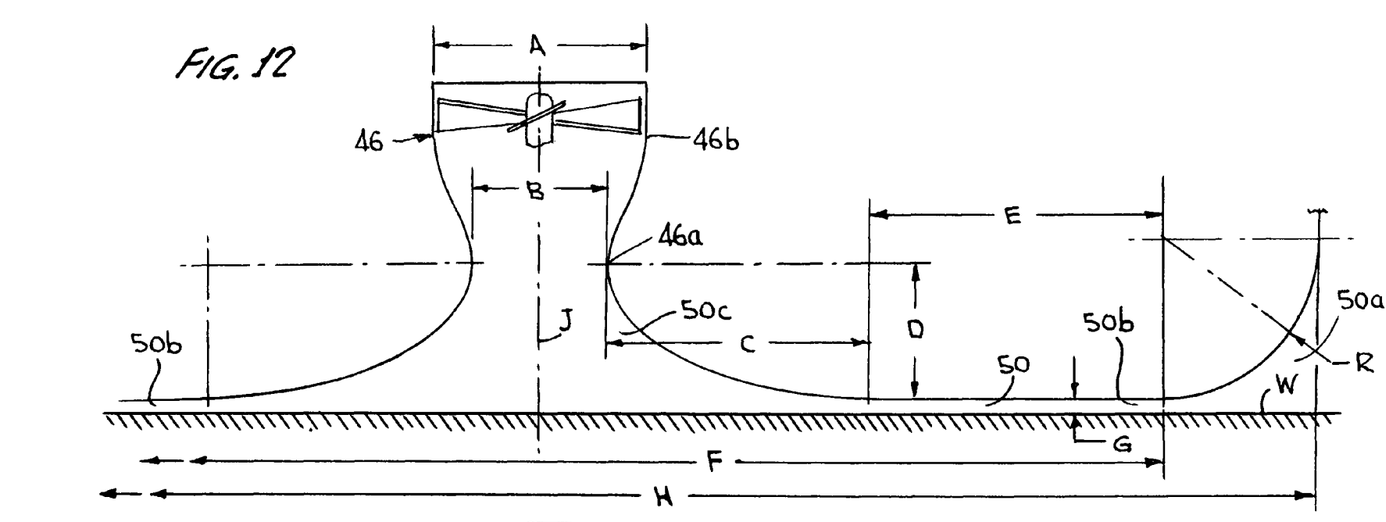
FIG. 12 shows a detailed diagram of one successful shape for the duct employed to form the high-velocity air stream, e.g., as employed in the second embodiment of FIGS. 3 and 4.

FIGS. 3 and 4 show a second embodiment of the Wall Racer; this embodiment appears likely to correspond to the earliest production version of the Wall Racer. FIG. 12 provides detailed dimensional information concerning this embodiment, and preproduction specifications are provided below as well.

Figure 5:
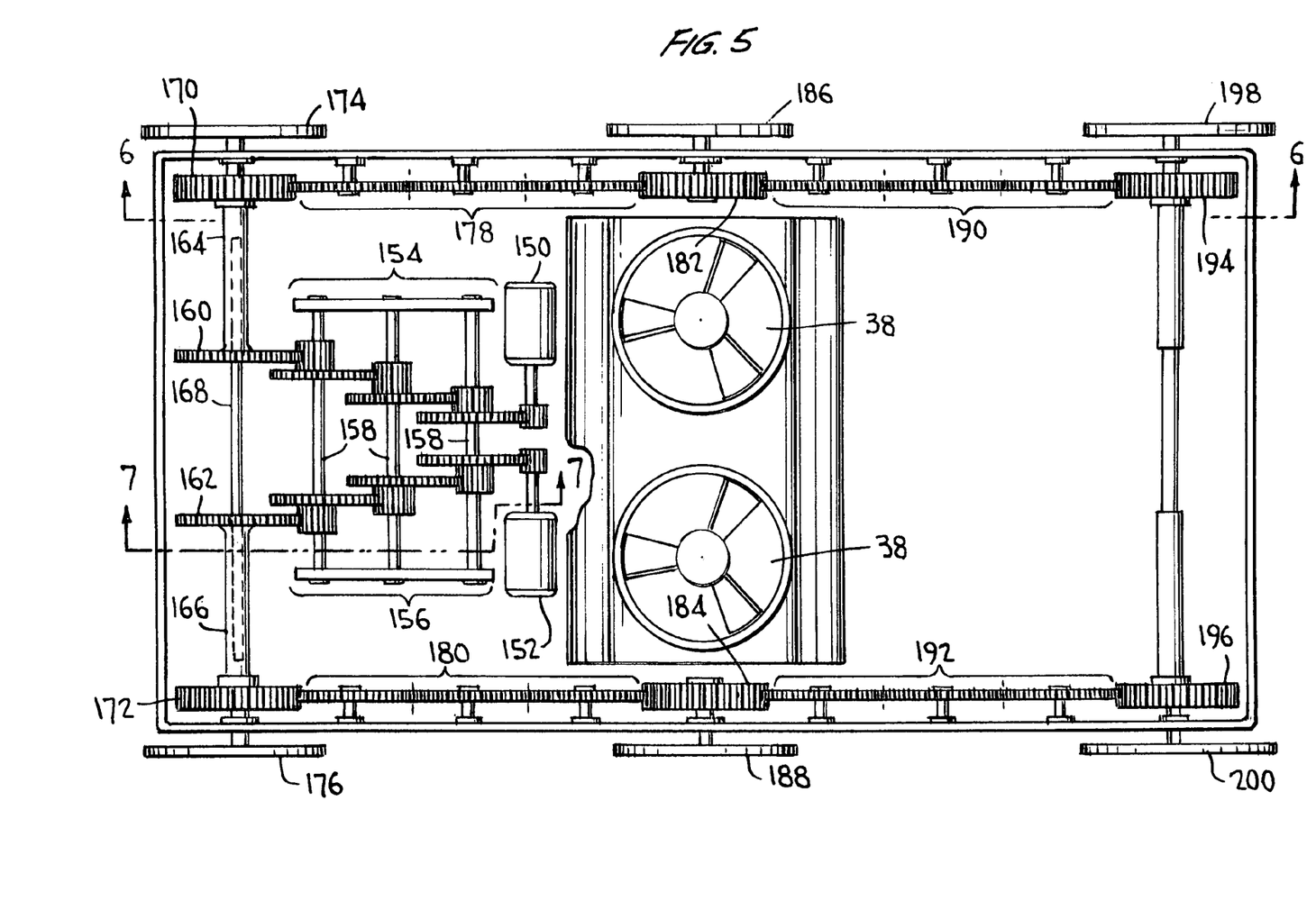
FIGS. 5, 6, and 7 show views of a gear train employed in the embodiment of FIGS. 3 and 4.
Figure 6:
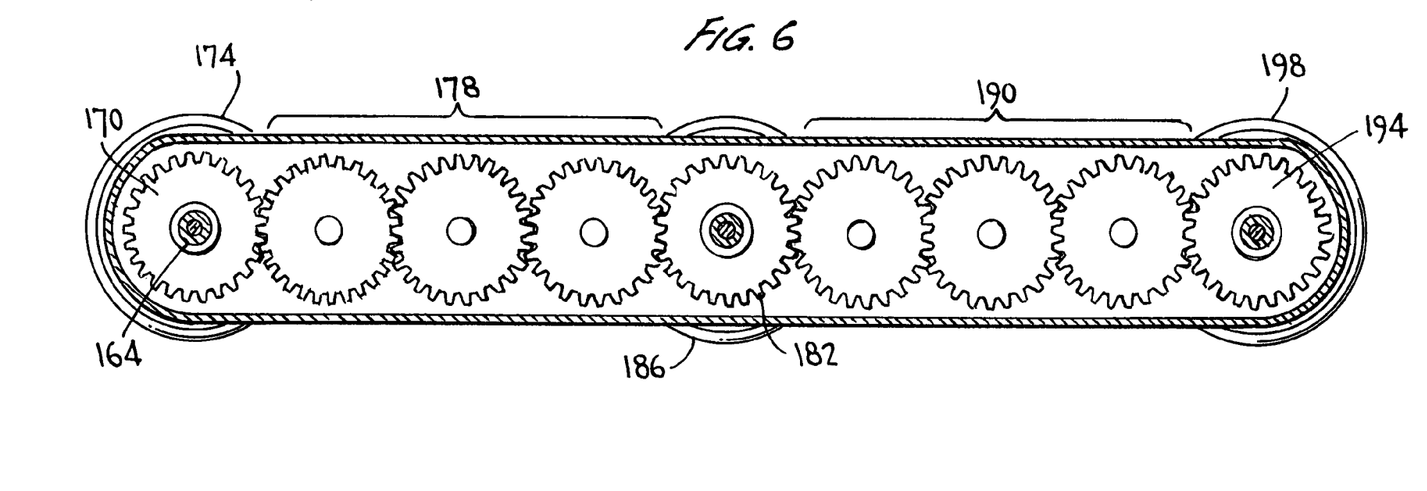
Figure 7:
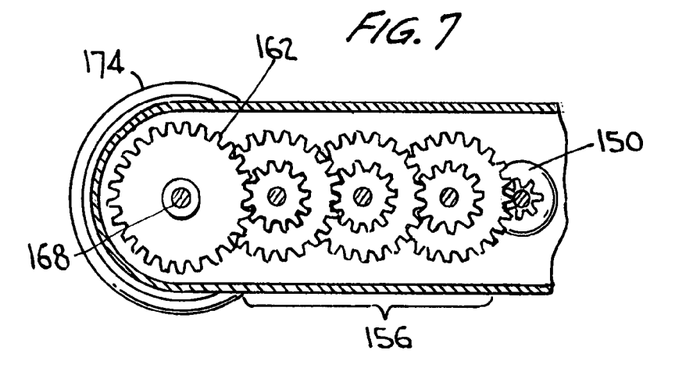

As shown by FIG. 3, in this embodiment two exhaust fans 38 are provided, spaced laterally from another on the transverse centerline of the chassis 40, and each fan being driven by a motor 39 with the fan mounted directly on the motor shaft. Six drive wheels 42 are provided, three on either side of the chassis 40, with the three wheels 42 on either side of the chassis being geared (or belt-driven) to one another so as to be driven in common by two separately radio-controlled motors. The radio control receiver and battery are not shown, as being generally within the skill of the art. FIGS. 5, 6, and 7 (discussed below) show a preferred gear train and motor arrangement. Thus, as in the FIG. 1 embodiment, steering is accomplished by differentially driving the wheels on either side of the chassis 40. As shown, skirts 44 are again provided, so as to ensure that the airflow is primarily from the ends of the chassis to the fan exhaust duct 46, in turn to ensure that an adequate area of high-velocity, low-pressure air flow is provided to generate adequate downforce. As illustrated by FIG. 4, the center pair of wheels are slightly lower in the chassis than the end pairs, so as to provide "teeter" and ensure that the center pair of drive wheels are always in good contact with the wall W.

Figure 13:
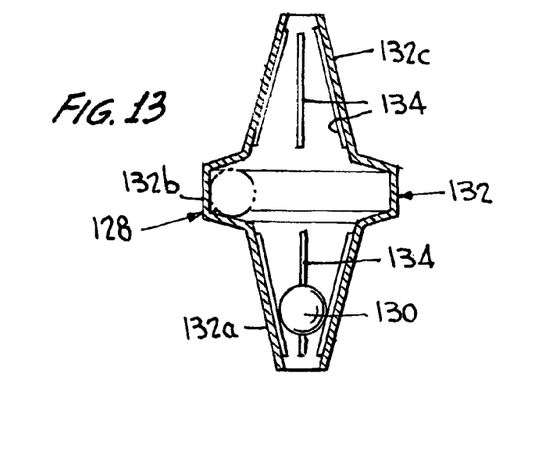

The pairs of wheels 42 at each end of the chassis are slightly proud of (i.e., extend slightly beyond) the respective ends of the chassis, so that as the vehicle approaches a wall while operating on a floor, the wheels contact the wall first. Thus providing the six-wheel arrangement of this embodiment allows the Wall Racer to make the transition from floor to wall in either direction. So that downforce urging the Wall Racer toward the floor does not prevent the Wall Racer from initially climbing the wall, the fans 38 are only energized when the chassis 40 reaches a predetermined inclination with respect to the horizontal. FIG. 13 shows a preferred switch, and FIG. 13A a circuit, for controlling the fans accordingly.

As indicated above, FIGS. 5, 6, and 7 show a preferred arrangement of the two drive motors and corresponding gear trains for differentially driving the six wheels of the Wall Racer in its FIGS. 3 and 4 embodiment. FIG. 5 shows a plan view, and FIGS. 6 and 7 cross-sectional views along lines 6-6 and 7-7 respectively. Thus, assuming the Wall Racer is traveling toward the right in FIG. 5, so that the upper side of the drawing is the "left", and the lower the "right", there are provided left-side and right-side drive motors 150 and 152 respectively. Motors 150 and 152 each drive reduction gear trains, 154 and 156 respectively; the gears of each are idlers, that is, spin freely on shafts 158, so that gears from both trains can be supported on the same shafts 158 while turning independently of one another. The output gears of train 154 and 156 drive gears 160, 162 respectively, which are fixed with respect to sleeve axles 164, 166 respectively, riding on a fixed axle 168, and thence to gears 170, 172 respectively. Gears 170, 172 are fixed to corresponding drive wheels 174, 176, and also drive further gear trains 178, 180, which drive central drive gears 182, 184, which are fixed to central drive wheels 186, 188. Central drive gears 182, 184 also drive further gear trains 190, 192; these in turn drive gears 194, 196, to which are fixed wheels 198, 200. Implementation of this drive arrangement is within the skill of the art; while the gear trains and axles are shown as mounted on a metallic frame 202, in production this chassis will typically comprise molded components.

It is also within the scope of the invention to employ a generally comparable arrangement to provide a four-wheel drive version of the vehicle of the invention, with differential steering as above. In this case one of the wheels might be mounted so as to spaced very slightly away from a plane contacted by the other three wheels; consequently the vehicle would "teeter" about an axis connecting the contact patches of the two of the wheels not diagonally opposite the wheel so spaced from the plane, so that either that wheel or the one diagonally opposite it would contact the plane. For example, if the left front ("LF") wheel were slightly spaced from a plane contacted by the RF, LR, and RR wheels, the vehicle would teeter about an axis connecting the points at which the RF and LR wheels contact the plane, and the teeter would be limited by contact of either the LF or RR wheels with the plane. By comparison, if the wheels were located so as to simultaneously contact a flat plane, the vehicle would tend to be much more sensitive to any irregularities in the surface.

Implementation of differential steering of a four-wheel drive vehicle would not be unduly complex. By comparison, if steering were to be accomplished by pivoting of one or both pairs of wheels, this would involve additional complexity.

It is to be noted that a differential steering arrangement in a four-wheel drive vehicle with all four wheels in good contact with the surface would involve substantial resistance to steering due to "tire scrub", that is, frictional resistance caused by the different effective turning radii of the "contact patch" of the tires on opposite sides of the vehicle. In general, to limit tire scrub within a given tire, relatively narrow tires are fitted to the drive wheels of the vehicles of the invention. Tire scrub becomes less significant as the overall size of the vehicle is reduced. To improve appearance, and to allow operation on thick carpets and the like, wider supplemental tires of slightly lesser diameter and formed of a lightweight foam or the like (not shown) can be assembled to the outer surfaces of the drive wheels.

As mentioned, FIG. 12 shows a detailed view of the underbody venturi duct 50 formed between the undersurface of chassis 40 and a juxtaposed surface, such as a wall W. This embodiment of the underbody was employed in one successfully-tested version of the second embodiment of the Wall Racer of the invention, as shown in FIGS. 3 and 4. FIG. 12 further provides reference to dimensional details of the chassis 40. In this version, the overall chassis length H is 11.828", with six wheels of 2.524" diameter; the wheelbase F of the outer pairs of wheels is 9.50", so that the wheels are proud of the chassis, i.e., extend slightly beyond the end of the chassis 40, in order to engage a vertical surface and thus enable the Wall Racer to climb a wall from the floor. The center axle is 0.050" closer to the wall W than the end pairs of wheels, so that the desired "teeter" is provided.

The underbody venturi duct 50 is longitudinally symmetric about a centerline J, with one end only shown in detail by FIG. 12. As shown in detail by FIG. 12, each "half" of the underbody duct 50 formed between the undersurface of the chassis 40 and the wall W comprises an entry portion 50a, a transition portion 50b, and an exit portion 50c, which makes a smooth transition into a fan duct 46, also of venturi shape, in which the fan(s) are located. Air enters each half of the underbody venturi duct at an inlet opening at the periphery of the chassis 40, defined by the entry portion 50a of underbody venturi duct 50. Entry portion 50a is defined by a radius R formed on the end of the chassis; in the version shown, this radius is 1.164". The axles of the front and rear pairs of wheels lie on the center of this radius, and are slightly larger in radius, so that each tire's rolling surface is somewhat proud of the chassis end, as noted. Entry portion 50a is faired into and connects smoothly with an extended flat transition portion 50b formed by a flat surface on the underside of the chassis; since the duct 50 formed between the underside of chassis 40 and the wall is of minimum cross-sectional area in this region, the maximum air flow velocity, and accordingly the maximum downforce per unit area, are developed here.

The goal in designing the underbody venturi duct 50 is to maximize the extent of the region of minimum cross-sectional area, while optimizing its cross-sectional dimension, so as to provide smooth, preferably non-turbulent flow into and out of this region, all in order to maximize flow velocity. To ensure smooth flow, the section of the undersurface of chassis 40 defining the upper bound of entry portion 50a is radiused, and the corresponding section defining the upper bound of exit portion 50c describes a portion of an ellipse. In the successfully-tested version depicted, this elliptical contour was drawn using a 2"×4" ellipse as found on a draftsman's "30-degree" template; that is, dimensions D and C are 1" and 2", respectively. As illustrated, then, the extent E of flat portion 50b is 2.25" long, forming a "tunnel flat". With the vehicle balanced on the center pair of wheels, so that the flat portion 50b is parallel to the wall, the ground clearance G therebetween is 0.098". Flat portion 50b makes a smooth transition to exit portion 50c, which as noted is 2.00" long and elliptical in longitudinal cross-section. Exit portion 50c in turn makes a smooth transition to a central venturi section 46a of fan duct 46, in which the fan(s) are located. In the two-fan embodiment of FIGS. 3 and 4 and detailed in FIG. 12, the longitudinal dimension B of the narrowest portion of this venturi section 46a is 1.00"; section 46a extends across the chassis 50 so as to form a transverse "mail slot". As it extends away from the wall, the mail slot section 46a then broadens out gradually in the longitudinal direction and is divided along the longitudinal centerline to form two circular-section ducts 46b in which the fans 38 are located; their diameter, dimension A, is 1.625".

The following are the principal specifications of a successfully-tested version of the Wall Racer, as shown in FIGS. 3 and 4 and dimensioned as in FIG. 12:

Wheelbase (dimension F) 9.5" (front to rear axle)
Track width 5.8" (centerline to centerline, at contact points)
Underbody duct width 4.9" (between skirts)
Chassis weight 584 g.
Body weight 29 g.
Total weight 613 g.
Weight distribution (without body, center axle unsupported):
Front axle 260 g (44.5%)
Rear axle 324 g (55.5%)
Ground clearance (dimension G) 0.098"
Motor voltage 6 v. nominal (five 1.2 v. 1000 mah NiMH cells)
Downforce fans current draw 4 amperes total
Ducted fans (two)—1.625" diameter, 3 blades
Total net downforce 1280 g.
Teeter (center axle offset) 0.050"
Fan RPM 30,000

The chassis itself can be molded of a lightweight foam material, having its undersurface shaped to define the venturi duct 50 in cooperation with the surface of the wall W. It is convenient to mount the components, such as bearings for the axles carrying the wheels, drive motors and gear or belt drive components, radio control receiver, batteries, and motor and fan assemblies, in recesses molded into the foam of the chassis. In particular, the fan assemblies may alternatively comprise hard plastic molded ducts within which the fan and drive motor are retained; the exit portion of the underbody venturi duct is then shaped to mate smoothly therewith.

In a successfully-tested prototype, the skirts 44 (FIG. 3) were formed of "Tyvek" spunbonded nonwoven olefin envelope material sized and located so as to curve outwardly at a nominal 45 degrees when in contact with the wall; a stiffening strip of plastic glued to the lower edge of the skirts, but spaced slightly therefrom, may be desirable to prevent local buckling.

Given the above detailed disclosure of the invention, those of skill in the art would have no difficulty in its practice. In particular, it will be appreciated that batteries (exemplary specifications being provided above) must be provided to power the fans and the drive wheels, that the drive wheels, three on each side in the embodiment of FIGS. 3 and 4, must be linked to one another and to the respective drive motor by gears, as illustrated in FIGS. 5, 6, and 7, or by belts or other means, and that the motors must be individually controllable by signals provided by an operator by way of a radio or infrared transmitter and receiver pair. These aspects of the implementation of the invention are within the skill of the art. It is also within the scope of the invention to drive each of the six wheels individually, that is, to eliminate the gear or belt arrangement in favor of separate motors for each wheel, but this alternative is considered undesirable as it would involve a weight penalty.

Figure 8:
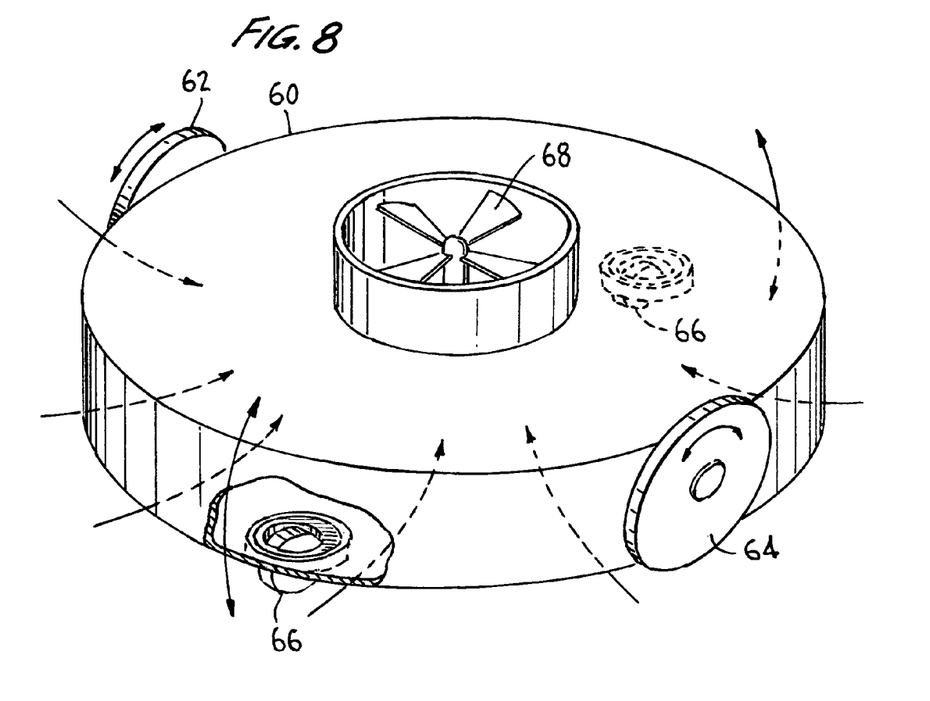
FIG. 8 and FIG. 9 show respectively a perspective view and an elevation in partial cross-section of a third embodiment of the Wall Racer.
Figure 9:
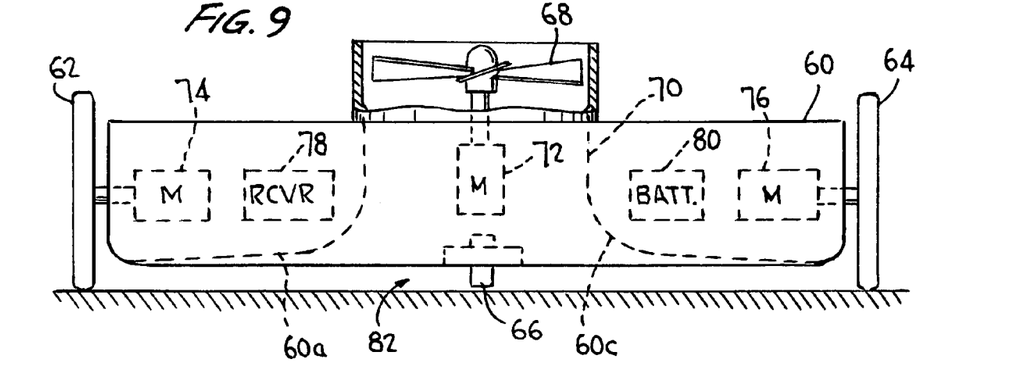

FIGS. 8 and 9 show as mentioned a third version of the Wall Racer, in this case with a circular chassis 60 to provide a "flying saucer" appearance. In this version, two drive wheels 62 and 64 are provided on diametrically opposed points on the chassis 60, with casters 66 on opposite sides, along a line perpendicular to the axis of the drive wheels 62 and 64. The casters may be raised slightly from a plane including both drive wheels and the casters, to provide "teeter" as above. (It will be apparent that this version of the Wall Racer cannot negotiate the transition between floor and wall.) Downforce is provided by a centrally-located fan 68 disposed in a venturi duct 70 and driven by a motor 72. Drive wheels 62 and 64 are individually driven by motors 74 and 76 responsive to control signals from a radio-control receiver 78 and powered by battery 80.

In this version, as mentioned above, the exhaust duct 70 is equidistant from all points on the periphery of chassis 60, so that the inward air flow path is of equal length at all points around the chassis 60. Hence there is no need for skirts, and the air flow is radially inward all around the periphery. Again, a radius is provided around the periphery of the lower edge of chassis 60, as illustrated at 60b, so that the inlet opening of the underbody venturi duct extends circumferentially around the chassis, and a large-radius or elliptical transition portion 60c is provided where the underbody duct 82 meets the exhaust duct 70, to ensure smooth and substantially non-turbulent airflow. The transition portion of the underbody duct 82 formed between the underside 60a of chassis 60 and the wall is preferably shallow and substantially conical in section, as illustrated, so that the cross-sectional area of the duct 82 stays constant as its radius from the center of exhaust duct 70 varies; in this way the velocity of the inward-flowing air stream and the differential pressure exerted thereby are both substantially constant, so that the downforce is exerted evenly at substantially all points on the chassis 60, that is, outside of duct 70.

Figure 10:
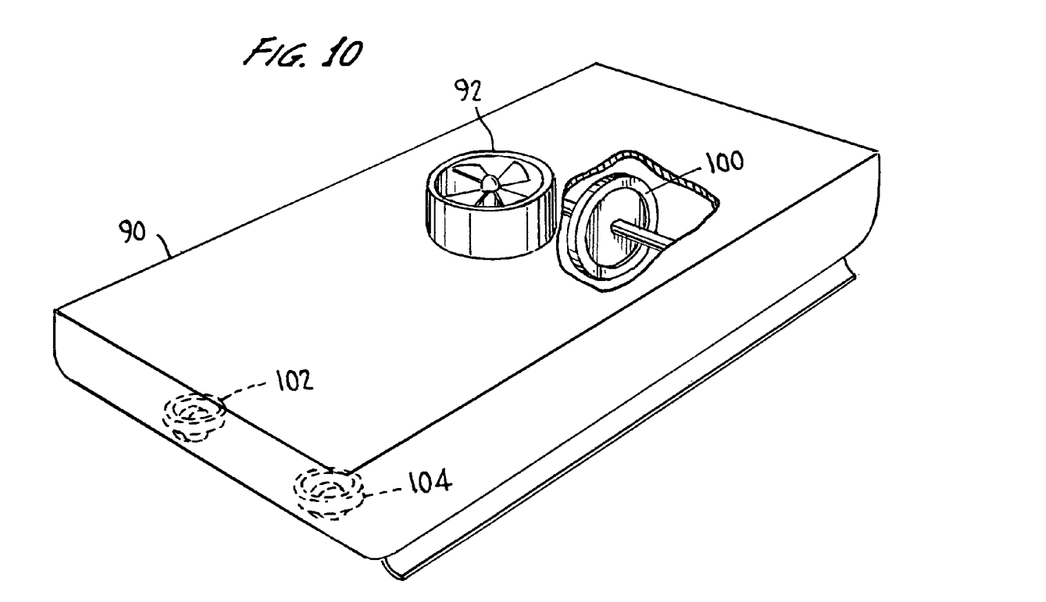
FIG. 10 and FIG. 11 show respectively a perspective view and an elevation in partial cross-section of a fourth embodiment of the Wall Racer.
Figure 11:
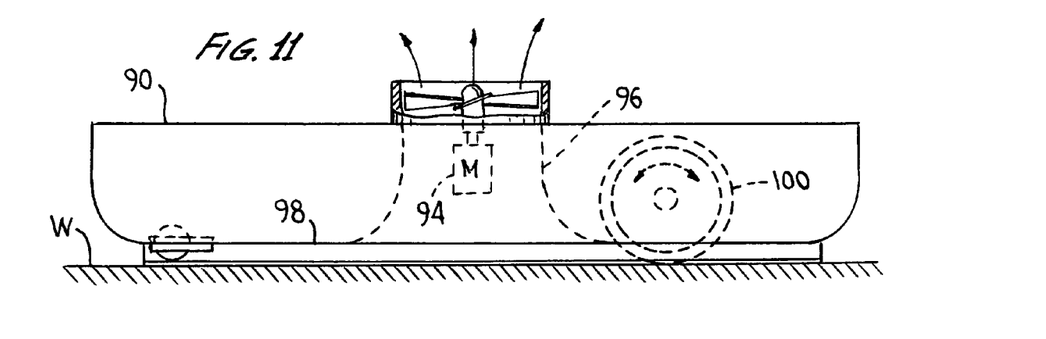

FIGS. 10 and 11 show a further version of the Wall Racer, again having an elongated chassis 90 suitable for mounting of a model race car body or the like. In this embodiment, a single fan 92 is located centrally on the chassis, is driven by a motor 94, and is disposed within an exhaust duct 96 communicating with an underbody venturi duct 98 formed between the underside of chassis 90 and the wall W. The underbody duct 98 is designed generally as discussed above with respect to FIG. 12.

In this embodiment, a single drive wheel 100 driven by a motor powered by a battery and responsive to control signals provided by a radio control receiver (none of the unnumbered components being shown) is located on the vehicle's longitudinal centerline, near the center of effort of the downforce, but disposed toward one end of the chassis so as not to interfere with the exhaust duct 96. Two casters 102 and 104 are mounted at the opposite end of the chassis 90. Caster 102 is free to pivot about an axis perpendicular to wall W, while caster 104 is also pivoted about a similarly perpendicular axis, but only between angular limits (see FIG. 14A, below).

Thus, chassis 90 rests on a tripod comprising drive wheel 100 and casters 102 and 104. If drive wheel 100 is driven so as to propel the vehicle toward the direction of the end of the chassis on which drive wheel 100 is disposed, that is, right-wardly in FIG. 11, the casters trail behind, and the vehicle travels in a straight line; if drive wheel 100 is driven in the opposite direction (counterclockwise in FIG. 11), the caster 104 provided with angular stops rotates about the axis perpendicular to wall W until its pivoting is stopped at one or the other of its angular limits, so the vehicle turns in one direction until the direction of travel is reversed. Hence directional control of the Wall Racer in this embodiment is substantially constrained; being greatly simplified, this embodiment might be best suited to a low-cost version of the invention.

Figure 14:
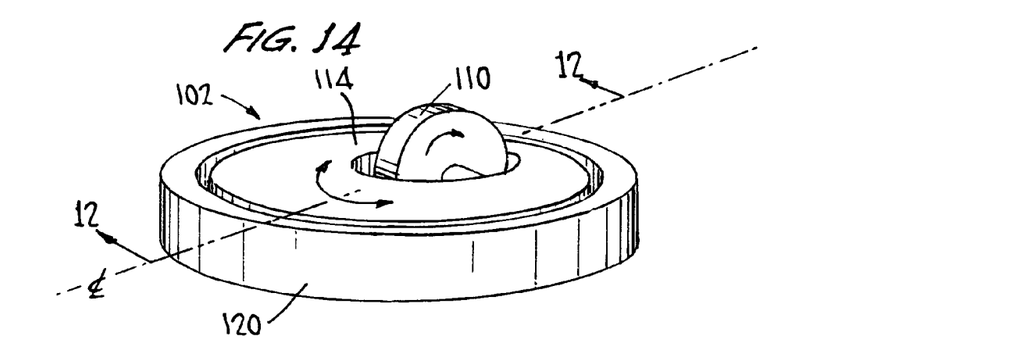
Figure 14A:
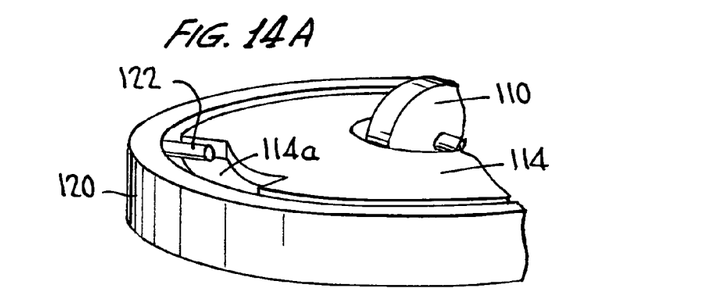
FIG. 14A shows a partial view corresponding to FIG. 14, illustrating a optional variation.
Figure 15:
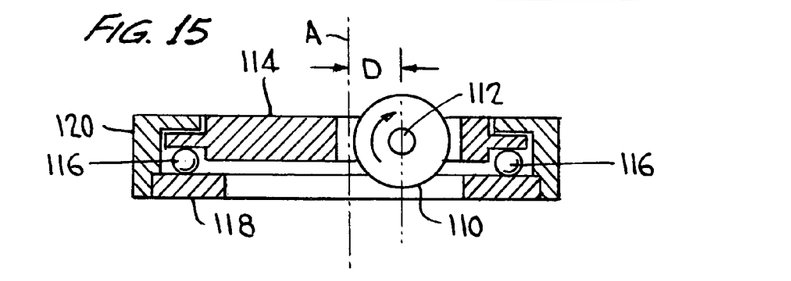
Figure 16:
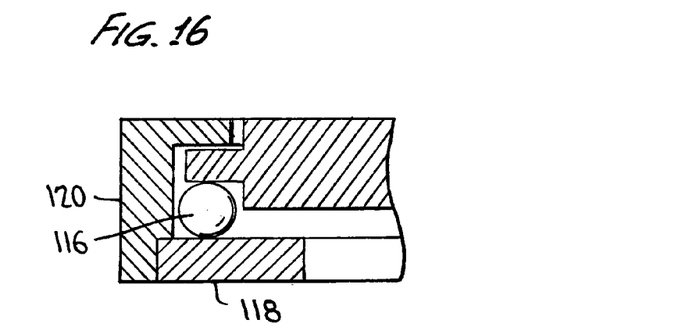

As mentioned, FIGS. 14-16 show respectively a perspective view, a cross-section, and an enlarged partial cross-section of a caster 102 used in several of the embodiments of the Wall Racer, while FIG. 14A shows a partial view corresponding to FIG. 14, illustrating a optional variation. In these views, the caster 102 is shown inverted, that is, with its face which would be juxtaposed to wall W oriented "up" in the drawings. A roller 110, which contacts wall W, is carried by an axle 112 that is mounted for rotation in a rotating plate 114; plate 114 rotates about an axis A perpendicular to but offset from that defined by axle 112. In the embodiment shown, rotating plate 114 in turn rides on a number of balls 116, which bear against a closure ring 118; closure ring 118 is secured to a frame 120, which can be mounted to the chassis. Thus, roller 110 engages the wall, and rotates about axle 112 as the vehicle is maneuvered; the assembly of roller 110, axle 122 and plate 114 can rotate with respect to frame 120 and thus with respect to the vehicle chassis, as the latter is steered. The axle 112 is offset with respect to the axis A about which plate 114 rotates, so that as the vehicle is steered, plate 114 rotates and roller 110 trails the axis A of rotation of plate 114.

If it is desired to restrict the rotation of plate 114, e.g., as discussed above with respect to the version of the Wall Racer shown in FIGS. 7 and 8, so as to provide some turning, albeit not precisely controlled, this can be accomplished as shown, for example, in FIG. 14A. As illustrated, a pin 122 extends through and is retained in the upper flange of frame 120 and fits within an angular recess 114a formed in the upper surface of rotating plate 114, limiting the degree of rotation about axis A that is permitted to plate 114.

Figure 13A:
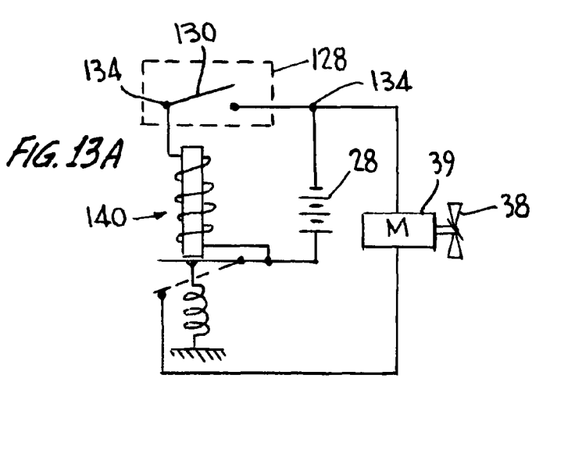
FIG. 13A shows a typical circuit in which it may be used.

As mentioned, in the embodiments of the Wall Racer in which it is capable of operation on a floor and climbing onto a wall (that is, the embodiment of FIGS. 3-7), it is desired to provide a switch that actuates the exhaust fan(s) only when the Wall Racer reaches a desired angle, typically between 30 and 60 degrees with respect to the horizontal, so that downforce does not prevent the vehicle from beginning to climb the wall as the wheels engage the wall's surface. FIG. 13 shows a switch 128 for so doing, and which also de-energizes the fan if the Wall Racer is placed upside-down, against a ceiling; this may be preferred for safety reasons, so that the Wall Racer cannot fall on anyone. FIG. 13A shows a typical circuit in which switch 128 may be used.

Switch 128 comprises an electrically conductive metal ball 130 disposed within a hollow nonconductive switch body 132. Body 132 is symmetrical about a vertical axis, and defines a generally frusto-conical lower portion 132a, in which ball 130 rests when the vehicle is on the floor, as shown in full, a disc-shaped central portion 132b, into which the ball falls, as indicated in dotted lines, when the vehicle begins to be oriented vertically, as when it begins to climb a wall, and a generally frusto-conical upper portion 132c, in which ball 130 falls if the Wall Racer is placed inverted against a ceiling. Conductive contacts 134 are disposed on the inner surfaces of lower portion 132a and upper portion 132c, so that when ball 130 is disposed in either the upper or the lower portions, it connects the contacts 134.

As shown in FIG. 13A, contacts 134 (two of which are connected in common) are wired in series with a normally-open relay 140 and battery 28, which controls a circuit including battery 28 and fan motor 39. Thus, with switch 128 closed, that is, with the Wall Racer essentially horizontal, and ball 130 making the connection between contacts 134, relay 140 is closed, as shown; when the Wall Racer leaves the horizontal sufficiently that ball 130 falls out of lower section 132a, into upper section 132b, relay 140 opens, closing the motor circuit and energizing motor 39, so as to drive fan 38. In this embodiment, if the Wall Racer is placed inverted against a ceiling, ball 130 falls into upper portion 132c, similarly connecting contacts 134, and preventing operation of fan motor 39.

Figure 17:
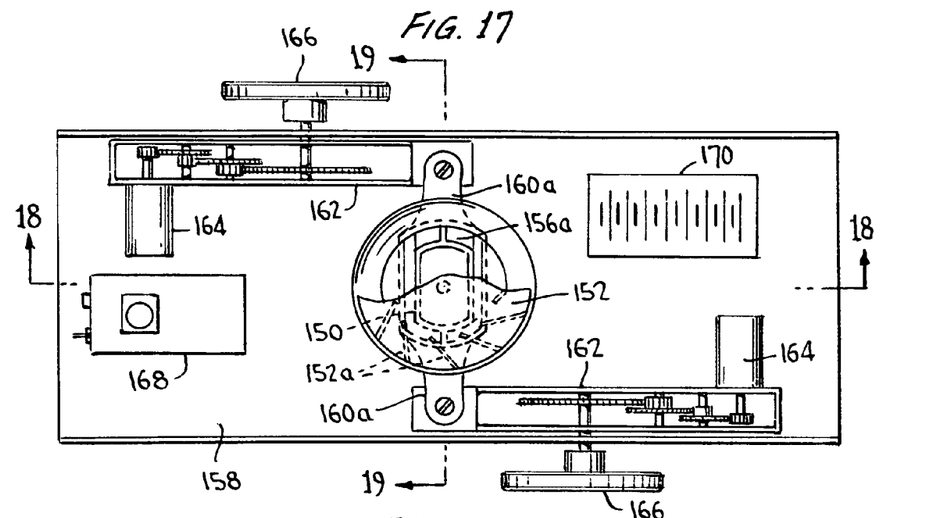
Figure 18:
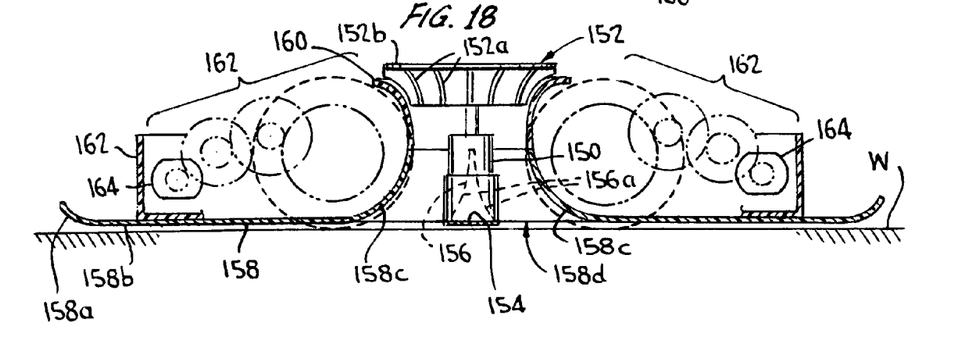
Figure 19:
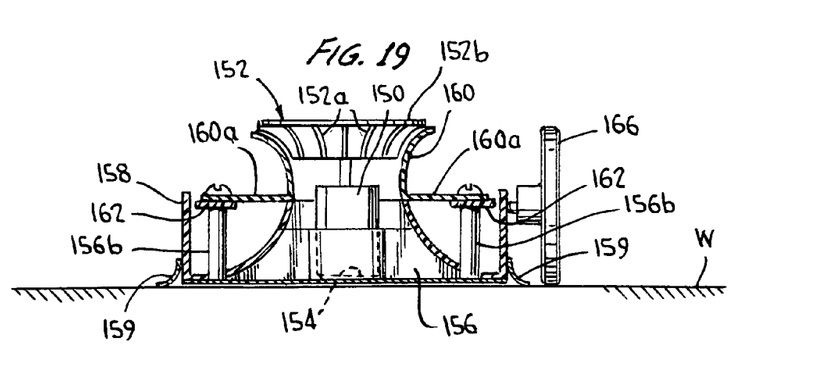
FIG. 19 is a partial cross-section taken along the line 19-19 in FIG. 17.

As mentioned, FIGS. 17-19 show a further embodiment of the invention. The principal improvements provided by this embodiment with respect to those discussed above are the provision of a radial-flow fan rather than the axial-flow fan(s) shown in the previous embodiments, provision of two drive wheels offset longitudinally from one another, principally for reasons of packaging convenience, and elimination of the casters or other wheels in favor of allowing the undersurface of the chassis to touch the wall.

Thus, as shown in FIGS. 17-19, a fan motor 150 drives a radial-flow fan 152, that is, comprising a circular end plate 152b and vanes 152a that are generally perpendicular to the end plate and angled with respect to the axis of rotation. Air is drawn in along the axis, that is, flowing upwardly around motor 150, and is exhausted radially outwardly. The radially outward ends of vanes 152a are curved so as to be closely juxtaposed to a diffuser or fan duct 160 defining a generally bell-shaped interior surface, for efficiency in use. Motor 150 is received in a recess 154 in a transverse member 156. Member 156 extends transversely across chassis 158, filling the central portion of a transverse "mail slot" 158d in chassis 158.

Generally as discussed above in connection with FIG. 12, and as shown by FIG. 18, chassis 158 is radiused at 158a to define entry portions of the underbody venturi duct, is flat at 158b to provide the transition portions thereof, and defines a smooth duct at 158c to define the exit portions thereof. Skirts 159 are again provided to prevent air entry along the long sides of the chassis 158. On either side of the motor-receiving recess 154, member 156 is shaped as indicated by dashed lines 156a, in order to provide a fair flow path for air drawn in at the ends of chassis 158. The exit portions of the venturi duct as formed by chassis 158 at 158c mate with diffuser duct 160, the inside surface of which is generally bell-shaped so as to be closely juxtaposed to vanes 152a of fan 152, as noted above. As also shown, assembly is simplified by formation of transversely-extending ears 160a on diffuser duct 160. Ears 160a mate with posts 156b formed on transverse member 156, as shown in FIG. 19; fasteners passing therethrough also secure gearboxes 162, which are discussed further below.

Propulsion for the vehicle is provided by two motors 164, which drive two drive wheels 166 through reduction gearboxes 162, as mentioned above. As previously, motors 164 are controlled responsive to radio, or preferably, infrared signals transmitted by a remote transmitter (not shown) and received by a receiver 168. Power for motors 164 as well as for fan motor 150 is provided by a battery 170. Electrical connection between these components, provision for battery charging, on-off switching, mechanical details such as the construction of gearboxes 162, selection and operation of receiver 168, and the control of motors 164 responsive to the received signals are within the skill of the art and need not be detailed here.

As illustrated, drive wheels 166 are offset longitudinally with respect to one another, and no casters are provided. The axes of drive wheels 166 are located with respect to the bottom surface of chassis 158 such that the flat central portion 158b of the chassis is spaced on the order of 0.020" from the wall surface W. Consequently, the chassis 158 "teeters", that is, pivots very slightly about a diagonal axis extending between the points at which drive wheels 166 contact the wall surface W, such that in use the teeter or pivoting is limited by undersurface of the chassis 158 contacting the wall surface W at one or the other diagonal corner. The undersurface of chassis 158 is made smooth to reduce friction between it and the wall surface W as the vehicle is propelled. Slight "bumps" might also be formed at the diagonal corners of the chassis, to localize the contact between the chassis and wall surface W. It is found that the friction experienced in use of the toy of the invention with walls and other surfaces of typical smoothness—e.g., conventionally painted interior walls—is sufficiently small as to present no difficulty, and likewise that the slight asymmetry in the airflow path under the chassis presents no difficulty.

Thus, in use, the fan 152 is energized and the vehicle is placed against a surface W. Air drawn by fan 152 passes inwardly from the ends of the chassis 158, up through the venturi tunnel collectively formed by the mail slot 158d in the chassis 158, transverse member 158, and diffuser duct 160, and exits fan 152 in the radially-outward direction. Downforce is thereby created, pulling the vehicle toward the wall surface W. Motors 164 can then be differentially activated to propel the vehicle in any desired direction.

While several preferred embodiments of the invention have been disclosed herein in detail, the invention is not to be limited by the disclosed embodiments, which are exemplary only.

What is claimed is:

1. A battery powered, remotely-controlled toy vehicle configured for operation on a substantially flat horizontal, inverted or vertical surface, comprising:
    a chassis having an undersurface;
    at least one wheel mounted on and cooperating with said chassis so as to support said chassis with respect to said substantially flat surface against which said wheel bears, such that the undersurface of said chassis is maintained at a predetermined distance from said substantially flat surface,
    a receiver responsive to a control signal from a remote transmitter,
    a battery,
    a first drive motor being supplied with current from said battery responsive to signals provided from said receiver,
    said at least one wheel being controllably driven by said first drive motor,
    a second fan drive motor, also being supplied with current from a battery, and
    a fan driven by said second motor, said fan being mounted in a fan duct extending through said chassis and arranged generally orthogonally with respect to said substantially flat surface, so as to draw a stream of air from between said undersurface of said chassis and said substantially flat surface,
    wherein said undersurface of said chassis is shaped so that when said vehicle is placed on said substantially flat surface with said at least one wheel in contact with said substantially flat surface, said undersurface and said substantially flat surface together define an underbody venturi duct, said underbody venturi duct extending from an entry portion at a periphery of said undersurface to said fan duct, whereby differential pressure between said stream of air flowing in said underbody venturi duct and the ambient air induces downforce urging said chassis toward said substantially flat surface;
    wherein the underbody venturi duct defined by said undersurface and said substantially flat surface comprises (1) the entry portion, having an inlet opening at the periphery, (2) an extended transition portion, of substantially uniform cross-sectional area, joining said entry portion to (3) an exit portion, said exit portion being connected to said fan duct, whereby air flows through said underbody venturi duct, from said inlet opening of said entry portion to and out of said fan duct; and
    wherein the portion of said undersurface which defines said extended transition portion is the portion of the undersurface most closely juxtaposed to said substantially flat surface.

2. The toy vehicle of claim 1, wherein the entry portion of said underbody venturi duct is defined by a radiused section of said undersurface of said chassis, extending from said inlet opening to said exit opening.

3. The toy vehicle of claim 1, wherein the exit portion of said underbody venturi duct is elliptical in cross-section, so as to smoothly join said transition portion to said fan duct.

4. The toy vehicle of claim 1, wherein the fan duct comprises an entry section of reduced cross-sectional area, at which said fan duct joins said the exit portion of said underbody venturi duct, and a section of larger cross-sectional area in which the fan is disposed.

5. The toy vehicle of claim 1, wherein said at least one wheel comprises a pair of drive wheels disposed on either side of said chassis, and driven differentially by separate motors responsive to signals from said receiver to steer said vehicle.

6. The toy vehicle of claim 5, wherein a pair of casters are provided on said chassis, substantially aligned along a line perpendicular to a line connecting said drive wheels on either side of said chassis.

7. The toy vehicle of claim 6, wherein said casters are disposed such that only one of said casters and said pair of drive wheels can contact a flat surface at any time.

8. The toy vehicle of claim 7, wherein said chassis is generally elongated, with the casters located at either end of the chassis, and the underbody venturi duct extends from either end toward a fan duct located in the center of the chassis, and further comprising flexible skirts extending along the long sides of the chassis to provide a partial seal between the undersurface of the chassis and the surface.

9. The toy vehicle of claim 6, wherein said casters comprise a roller mounted on an axle, the combination of said roller and said axles being journaled for free rotation about a first axis fixed with respect to a plate, said plate in turn being journaled for free rotation about a second axis fixed with respect to a frame, said first axis being perpendicular to the plane of said second axis but offset with respect to said second axis, said frame being adapted to be affixed to the chassis of said vehicle, whereby when said roller is in contact with a surface and said vehicle is driven to move with respect to said surface, said plate rotates so as to align said roller with the direction of motion of said vehicle.

10. The toy vehicle of claim 5, wherein said drive wheels are displaced longitudinally with respect to one another.

11. The toy vehicle of claim 10, where in use said chassis pivots along a line connecting the points at which said wheels contact a generally planar surface, and wherein the degree of such pivoting is limited by said chassis contacting said surface.

12. The toy vehicle of claim 1, wherein said chassis is generally circular in plan, with the fan located in the center of the circular chassis, and wherein said underbody venturi duct is substantially radially symmetric thereabout.

13. The toy vehicle of claim 1, wherein said chassis is generally elongated and comprises three pairs of drive wheels, each pair of wheels including a wheel on either side of said chassis, one pair of wheels being located at each end of said chassis and the third pair being located centrally, all of the three drive wheels on either side of the chassis being driven together, but differentially from the three drive wheels on the opposite side of said chassis, and wherein the pairs of wheels at the ends of the chassis are disposed with respect to the chassis and the central pair of wheels such that only one of the end pairs of wheels and the central pair can touch a flat surface simultaneously.

14. The toy vehicle of claim 13, wherein the end pairs of wheels are disposed with respect to the respective ends of the chassis such that they are proud thereof, whereby the end pairs of wheels can engage a surface perpendicular to a surface in contact with one of the end pairs of wheels and the central pair of wheels.

15. The toy vehicle of claim 14, wherein the ends of said chassis between the respective end pairs of wheels are shaped to define a radius slightly less than the radius of said wheels, and are substantially coaxial therewith, said radiused ends of said chassis forming the entry portions of said underbody venturi duct.

16. The toy vehicle of claim 15, further comprising flexible skirts extending along the long sides of the chassis to provide a partial seal between the undersurface of the chassis and the surface.

17. The toy vehicle of claim 14, further comprising a switch operated as said vehicle climbs from a horizontal to a vertical position, so as to then activate said fan.

18. The toy vehicle of claim 17, wherein said switch comprises a conductive ball confined within a closed container fixed to said chassis, wherein electrical contacts in a circuit controlling operation of said fan motor are located on an interior wall of said container so as to be electrically connected by said ball when said chassis is in a first position with respect to the horizontal, and electrically isolated when said chassis is in a second position with respect to the horizontal.

19. The toy vehicle of claim 1 wherein said chassis is generally elongated, two casters are located at opposite sides of one end of the chassis, the underbody venturi duct extends from either end toward a fan duct located in the center of the chassis, and a single drive wheel is disposed on the longitudinal centerline of the chassis on the side of the fan duct opposite the end of the chassis on which the casters are located.

20. The toy vehicle of claim 19, further comprising flexible skirts extending along the long sides of the chassis to provide a partial seal between the undersurface of the chassis and the surface.

21. The toy vehicle of claim 19, wherein said casters each comprise a roller mounted on an axle, the combination of said roller and said axles being journaled for free rotation about a first axis fixed with respect to a plate, said plate in turn being journaled for free rotation about a second axis fixed with respect to a frame, said first axis being perpendicular to the plane of said second axis but offset with respect to said second axis, said frame being adapted to be affixed to the chassis of said vehicle, whereby when said roller is in contact with a surface and said vehicle is driven to move with respect to said surface, said plate rotates so as to align said roller with the direction of motion of said vehicle, wherein the degree of rotation of said plate of one of said casters is restricted to a predetermined angle of free rotation, whereby when said vehicle is driven in the direction of said casters, the vehicle is steered by the roller of said one of said casters.

22. The toy vehicle of claim 1, wherein two fans are provided, disposed in fan ducts communicating with said underbody venturi duct, both fans being driven by motors to draw a stream of air from an entry opening on the periphery of the chassis of said vehicle, through said underbody venturi duct and out through said fan ducts.

23. The toy vehicle of claim 1, wherein said fan is a radial-flow fan.

24. The toy vehicle of claim 23, wherein said radial-flow fan comprises a circular end plate and a plurality of vanes generally perpendicular to said end plate and angled with respect to the axis of rotation of said fan.

25. The toy vehicle of claim 24, wherein radially outward ends of said vanes are curved so as to be closely juxtaposed to a fan duct defining a generally bell-shaped interior surface.

26. The toy vehicle of claim 1, wherein a transverse member extends across said exit portion of said underbody venturi duct, said transverse member being shaped so as to provide a fair flow path for air flowing through said exit portion of said underbody venturi duct.

27. The toy vehicle of claim 1, wherein the entry portion of the underbody venturi duct has a relatively small exit opening and the inlet opening of the entry portion is relatively large, said inlet opening and exit opening being connected to said extended transition portion by surfaces shaped such that the cross-sectional area of said entry portion varies smoothly.

28. A battery powered, remotely-controlled toy vehicle configured for operation on a substantially flat horizontal, inverted, or vertical surface, comprising:
- a chassis having an undersurface;
- at least one wheel mounted on said chassis and cooperating therewith so as to support said chassis with respect to said substantially flat surface against which said wheel bears, such that the undersurface of said chassis is maintained at a predetermined distance from said substantially flat surface,
- a receiver responsive to a control signal transmitted from a remote transmitter,
- a battery,
- a first drive motor being supplied with current from said battery responsive to control signals received by said receiver,
- said at least one wheel being controllably driven by said first drive motor,
- a second fan drive motor, also being supplied with current from a battery, and
- a fan driven by said second motor, said fan being mounted in a fan duct extending through said chassis and arranged generally orthogonally with respect to said substantially flat surface, so as to draw a stream of air from between said undersurface of said chassis and said substantially flat surface,
- wherein said undersurface of said chassis is shaped so that when said vehicle is placed on a substantially flat surface with said at least one wheel in contact with said substantially flat surface, said undersurface and said substantially flat surface together define an underbody venturi duct extending from an inlet opening at a periphery of said undersurface, the undersurface in cross-section defining an entry section, an extended transition section, and an elliptical exit section, the elliptical exit section being in communication with said fan duct, whereby differential pressure between said stream of air flowing in at least said transition portion of said underbody venturi duct and the ambient air induces downforce urging said chassis toward said substantially flat surface; and
- wherein the section of said undersurface which defines said extended transition section is the section of the undersurface most closely juxtaposed to said substantially flat surface.

29. The vehicle of claim 28, wherein said chassis is radially symmetric about said fan duct, such that said inlet opening extends circumferentially around said chassis, wherein the transition section of the undersurface in cross-section is inclined with respect to the substantially flat surface, whereby said reduced area transition portion of the underbody venturi duct is generally conical in cross-section so that the cross-sectional area of said underbody duct is substantially constant over its radial extent thereof, so that the velocity of the air stream flowing therethrough is substantially constant.

30. The vehicle of claim 28, wherein said chassis is elongated, being symmetric about a transverse axis on which the fan duct is disposed, and having opposed ends at which inlet openings for symmetric underbody venturi ducts are formed, and wherein the transition sections of the undersurface in cross-section thus defined are substantially parallel with respect to the substantially flat surface, so that the cross-sectional areas of the transition sections of the underbody venturi ducts thus defined are substantially constant.

31. The vehicle of claim 30, wherein a transverse member extends across said exit portion of said underbody venturi duct, said transverse member being shaped so as to provide a fair flow path for air flowing through said exit portion of said underbody venturi duct.

32. The vehicle of claim 30, further comprising flexible skirts extending along the long sides of said chassis.

33. The vehicle of claim 32, wherein said drive wheels are displaced longitudinally with respect to one another, such that in use said chassis pivots along a line connecting the points at which said wheels contact said substantially flat surface, and wherein the degree of such pivoting is limited by said chassis contacting said surface.

34. The vehicle of claim 30, wherein two drive wheels are provided, said drive wheels being disposed on opposite longitudinal sides of said chassis and provided with drive motors individually actuated in response to said control signals.

35. The vehicle of claim 28, wherein said fan is a radial-flow fan comprising a circular end plate and a plurality of vanes generally perpendicular to said end plate and angled with respect to the axis of rotation of said fan.

36. The vehicle of claim 35, wherein radially outward ends of said vanes are curved so as to be closely juxtaposed to a generally bell-shaped interior surface defined by said fan duct.

37. The vehicle of claim 28, wherein the entry section of the undersurface is radiused, whereby the cross-sectional area of said underbody venturi duct varies smoothly from the inlet opening to the transition section, wherein the transition section has a reduced area.

* * * * *